United States Patent
Menninger et al.

(10) Patent No.: US 7,904,598 B2
(45) Date of Patent: *Mar. 8, 2011

(54) REMOTE RADIO SPECTRUM INFORMATION ACQUISITION

(75) Inventors: Peter D. Menninger, Langhorne, PA (US); James M. Quinn, Riverton, NJ (US); Peter J. Body, Pottstown, PA (US)

(73) Assignee: Traffic.com, Inc., Wayne, PA (US)

( * ) Notice: Subject to any disclaimer, the term of this patent is extended or adjusted under 35 U.S.C. 154(b) by 325 days.

This patent is subject to a terminal disclaimer.

(21) Appl. No.: 12/180,295

(22) Filed: Jul. 25, 2008

(65) Prior Publication Data

US 2009/0024738 A1     Jan. 22, 2009

Related U.S. Application Data

(62) Division of application No. 10/463,056, filed on Jun. 17, 2003, now Pat. No. 7,406,543.

(60) Provisional application No. 60/430,021, filed on Nov. 29, 2002.

(51) Int. Cl.
    *G06F 15/16* (2006.01)
(52) U.S. Cl. ......... 709/246; 709/203; 709/208; 709/209; 709/223; 709/231
(58) Field of Classification Search ................ 709/246, 709/203, 208, 223, 224, 231, 209
    See application file for complete search history.

(56) References Cited

U.S. PATENT DOCUMENTS

| 4,698,805 | A |   | 10/1987 | Sasuta et al. |         |
|-----------|---|---|---------|---------------|---------|
| 5,574,999 | A |   | 11/1996 | Gropper       |         |
| 6,104,725 | A | * | 8/2000  | Kavak et al.  | 370/466 |
| 6,496,687 | B1|   | 12/2002 | Switlyk       |         |
| 6,961,555 | B1|   | 11/2005 | Philyaw       |         |
| 2002/0138587 | A1 | * | 9/2002 | Koehler et al. | 709/207 |
| 2003/0018975 | A1 | * | 1/2003 | Stone         | 725/105 |
| 2004/0008632 | A1 | * | 1/2004 | Hsu et al.    | 370/252 |

OTHER PUBLICATIONS

WinScan780, Version 1.0 Scanner Control Software, Pozilla Software Corp., Copyright © 2000, printouts from websites: http://www.pozillasoft.com/winscan780.htm and http://www.pozillasoft.com/780screenshots.htm, printout date: Nov. 23, 2002, 8 pages
Instruction Manual for Model No. IC-PCR100 communications receiver, Icom Inc., Osaka, Japan, Copyright © 1998, 44 pages.
Operating Guide for Model Bearcat BC780XLT Trunk Tracker III scanner from Uniden, Fort Worth, Texas, Copyright © 2000 Uniden America Corporation, 97 pages.

(Continued)

*Primary Examiner* — Larry Donaghue
*Assistant Examiner* — Nicholas Taylor
(74) *Attorney, Agent, or Firm* — Lisa M. Schoedel; Frank J. Kozak; Jon D. Shutter

(57) ABSTRACT

A scanner system provides real-time remote acquisition of a scanner's audio signals and visual display, and real-time remote control of scanner operations, including settings and functions. The scanner system may be used to gather information in a regional market by listening to geographically distant broadcasts available on radio spectrum frequencies. By synchronizing multi-spectrum monitoring, audio delivery, visual cueing, and control of spectrum reception, geographically independent persons can process scanner information as if they were physically present in the market. Thus, operators can gather information from public agencies and radio broadcasts from a remote market as if they were present in the market. The scanner audio signals may be used to produce traffic reports.

30 Claims, 16 Drawing Sheets

OTHER PUBLICATIONS

The Art of DNS, Copyright © 2000-2002, printouts from websites: http://www.dnsart.com/Home/; http://www.dnsart.com/What.is.Dynamic.DNS/; and http://www.dnsart.com/Download/, printout date: Nov. 23, 2002, 5 pages.

Dynamic DNS Network Services, LLC, Copyright © 1999-2002, printouts from websites: http://www.dyndns.org/; http://www.dyndns.org/corporate/; and http://www.dyndns.org/dyndns/, printout date: Nov. 23, 2002, 5 pages.

Real-Time Transfer of Digital Audio Files, printout from website: http://www.noisebetweenstations.com/personal/essays/audio_on_the_internet/RealTimeTransfer.html, printout date: Nov. 27, 2002, 1 page.

Realaudio word mark printout from U.S.P.T.O. Trademark Electronic Search System (TESS), printout date: Nov. 27, 2002, 2 pages.

Welcome to Squelch; the scanner pages of Peter van Bommel, printout from website: http://www.bommeltje.nl/scanners/english/index.shtml, Copyright © 1997-2001 Peter van Bommel, printout date: Nov. 23, 2002, 3 pages.

Enck, J. "Avalon's Remotely Possible/32 Remote Control Software," printout of article from website: http://www.winnetmag.com/Articles/Index.cfm?ArticleID=2536, printout date: Nov. 25, 2002, Article date: May 1996, 3 pages.

Symantec, Inc. pcAnywhere®, Copyright © 1995-2002 Symantec Corporation, printout from website: http://www.symantec.com/pcanywhere/Consumer/, printout date: Nov. 25, 2002, 2 pages.

VNC—Virtual Network Computing from AT&T Laboratories Cambridge, Copyright © 1999, printout from website: http://www.uk.research.att.com/vnc/index.html, printout date: Nov. 25, 2002, 2 pages.

Bussiere, P. "pcAnywhere versus VNC," printout of article from website: http://www.checksix.net/wins/vnc.htm, printout date: Nov. 25, 2002, 2 pages.

Strong Signals—Scanner/Receiver Glossary, Copyright © 2002 Richard J. Wells, printout from website: http://www.strongsignals.net/access/content/glossary.html, printout date: Nov. 23, 2002, 27 pages.

buddyPhone—internet communications, BuddyPhone Inc., San Diego, CA, a nikotel company, printouts from buddyPhone websites: http://www.buddyphone.com and http://www.buddyphone.com/about, printout date: Nov. 23, 2002, 2 pages.

Epinions.com review of buddyPhone CollegeClub, printout from website: http://www.beta.epinions.com/cmd-review-4502-BA99E4B-39E4C2CC-prod1..., printout date: Nov. 23, 2002, 4 pages.

Weems, W.A. "Creating RealAudio (RA) Web Resources," Copyright © 1997 University of Texas Houston, printout of article from website: http://www.uth.tmc.edu/oac_docs/ra-training/using-ra-html, printout date: Nov. 25, 2002, 3 pages.

Creative Labs products, printout from Creative Labs websites: http://www.americas.creative.com/ and http://www.americas.creative.com/products/category.asp?category=461..., printout date: Nov. 25, 2002, 4 pages.

* cited by examiner

Remote Radio Spectrum Information Acquisition System
High-Level Overview

Remote Radio Spectrum Information Acquisition System Dedicated Circuit Implementation

Typical Streaming Architecture

REMOTE RADIO SPECTRUM INFORMATION ACQUISITION

CROSS-REFERENCE TO RELATED APPLICATIONS

This application is a divisional of U.S. application Ser. No. 10/463,056, now U.S. Pat. No. 7,406,543, filed Jun. 17, 2003, the entire disclosure of which is incorporated herein by reference.

This application claims the benefit of U.S. Provisional Application No. 60/430,021 filed Nov. 29, 2002 entitled "REMOTE RADIO SPECTRUM INFORMATION ACQUISITION."

BACKGROUND OF THE INVENTION

The present invention relates to information acquisition from, and control of, remotely located scanners, and use of such scanners for collection of news, traffic (e.g., traffic incident reporting), weather, police, fire and rescue activities, and the like.

Information gathering organizations are always looking for methods to improve the information gathering process. Technology has provided many new tools and opportunities for such organizations. The ability to monitor public airwaves has provided a valuable tool to alert and inform an organization of possible incidents and events. As technology progressed, Radio Spectrum Frequency scanners became a basic tool to collect information. A scanner or scanning radio is a specialized radio receiver designed to tune a wide range of frequencies. Frequencies are stored in channels and selectively scanned or the scanner can search through an entire frequency range. Scanner receivers differ in contrast to radio communication receivers in that they usually do not have a variable frequency oscillator (VFO) and they usually do not cover the high frequency (HF) 3-30 MHz spectrum. Scanners usually scan and search much faster than regular receivers.

Scanners allow a user to obtain information from organizations such as Police, Fire-Rescue and Ambulance. Dispatching activities can inform a listener of possible issues that affect a community and impact activity, such as travel. One problem that occurs when trying to monitor radio broadcast activities is the limited distance that these broadcast signals cover. Signals are shared and transmission power is limited to avoid problems with the shared signals. To extend the reach of an information gathering organization, satellite collection agents were employed to gather information not physically present at a primary gathering office.

More advanced applications of radio frequency spectrum scanners placed a scanner into a remote location and used audio links to forward sound to a central monitoring facility. This solution provided a blind solution making it difficult to attribute the sound of a transmission to the transmitting entity. Being able to see a scanner display allows a user to cover many frequencies and view the frequency when a transmission is heard, thereby associating the transmission source. In addition to the difficulty with the blind nature of a remote audio solution, any tuning or changes that were required to the remote unit required someone to physically visit the unit in the field. Real-time interaction is extremely valuable, but not available to any of these legacy solutions. If an important transmission is heard, locking into a frequency allows a user to acquire addition information that may be lost if scanning resumes. Scanning of frequency banks is likely to occur when control is not present.

Integration of audio, video and control are desirable to maximize the value of a remotely deployed unit. Some existing products provide a limited ability to meet this need. For example, products are available which allow a scanner to be controlled by a personal computer (PC) located physically adjacent to the scanner and connected to an RS-232C port of the scanner via a hardwired cable (PC interface). Software executing on the PC presents a simulated display of the scanner and the user can control selected functions of the scanner by interacting with the simulated scanner display. One such product is software associated with the Model No. IC-PCR100 and PCR1000 scanners from Icom Inc., Osaka, Japan. Another product is third-party software for the Model Bearcat BC780XLT Trunk Tracker III scanner from Uniden, Fort Worth, Tex. The third-party software is WinScan® 780, Version 1.0 Scanner Control Software, available from Pozilla Software Corp. Neither of these products, nor the associated software, allow for remote user capabilities. When using these PC interface products, the external speaker output jack of the scanner is connected to a speaker or microphone input of the PC, thereby allowing the scanner's audio to be played in real-time through the speakers of the PC. This scheme provides no ability to play the audio at a location remote from the PC.

Many software and hardware manufacturers produce audio and streaming products. Microsoft produces Windows Media, and RealNetworks, Inc., Seattle, Wash., produces a plurality of streaming audio products. The current methods of streaming audio suffer from buffering and time delays, as discussed in more detail below. Hardwired audio links have also been employed to provide blind solutions.

FIG. 15 shows a typical prior art architecture for streaming audio and video data. Functional responsibilities are highlighted underneath each of the components. FIG. 16 provides an overview of the processing requirements to create and distribute an audio stream in accordance with the prior art. More specifically, FIG. 15 provides an overview of the functions performed on an audio or video stream as a stream is prepared and delivered to clients or consumers of the data stream. The processing requirements for both audio and video are practically identical, except that video produces a significantly larger data stream.

Referring to FIG. 15, streaming data is broadcast from a head-end or source (1401 through 1405). The most common form of stream is read from a file, which contains a previously encoded data stream. Streaming audio from a real-time source involves real-time encoding of audio or video source. Once encoded, a stream is compressed to optimize network bandwidth. Compression requires both time and processing cycles. After a data stream is compressed, it is prepared for broadcasting (1405). Broadcasting a data stream allows many users to attach to a data stream (1406 through 1408). A distribution infrastructure is built proportional to the number of concurrent users receiving the data stream (1404 and 1405). Streaming audio is the primary method of distributing audio on the Internet today.

Streaming audio, especially in real-time, is constrained by parameters associated to streaming technology. Streaming data operates most efficiently on low overhead protocols, which reduces head end resources and network bandwidth requirements. Common distribution protocol leverages User Datagram Protocol (UDP), Multicast, or other broadcast technologies to deliver data over a stateless and connectionless network transport. The combination of real-time encoding, broadcasting to many users, and connectionless or lightweight data delivery has several adverse effects on an audio or video stream.

Buffering of streaming audio is problematic when applied to certain applications that have real-time needs. An audio stream is buffered to maximize compression. Compression is more effective when applied to larger data sets. To achieve compression, the encoding source buffers data to achieve better compression. The client or listener also buffers a data stream. Client buffering addresses network delivery issues such as out of sequence packets and network throughput issues. While buffering provides an enhanced experience for the average Internet user, buffering introduces a serious problem for a control-based system. Buffering delays transmission, which introduces a delay in the control feedback loop. For example, audio systems such as RealAudio® (a product of RealNetworks, Inc., Seattle, Wash.) use a buffering system to give the illusion of real-time transfer. The software in such audio systems delay reproducing a transmission for a human perceptible period of time in the order of seconds to build a buffer of data. This process ensures that a smooth reproduction will occur even if there is a delay in the transmission link.

The only conventional way to coordinate audio, video and control of a scanner in real time is to have personnel local to the scanner itself. In addition, scanning radio broadcasts covering large number of public agencies requires several difference technologies, including legacy analog systems, trunk systems and new digital transmission methods. The majority of the scanner market is focused on non-commercial applications such as the hobbyist. Thus, there is a significant problem in developing real-time remote control scanner solutions that work across such various platforms. In sum, prior approaches and technologies continue to have deficiencies, especially in processing information that requires real-time control and other remote interaction, as well as real-time listening of audio.

BRIEF SUMMARY OF THE INVENTION

In a first embodiment of the present invention, a processing unit receives an audio signal output of the scanner. The processing unit prepares the audio signal for transmission over a network by encoding the audio signal output of the scanner to digitally encoded audio. A scanner workstation is physically remote from the processing unit and the scanner. The workstation includes an application for receiving the digitally encoded audio and decoding the digitally encoded audio to an original audio signal output of the scanner. A transport network having at least two edge nodes is in communication at one edge node with the processing unit to receive the digitally encoded audio and is in communication at the other edge node to provide the digitally encoded audio to the scanner workstation.

In a second embodiment of the present invention, traffic report information is produced using one or more scanners. Each scanner includes an audio signal output. A processing unit receives an audio signal output of the scanner. The processing unit prepares the audio signal output for transmission over a network by encoding the audio signal output to digitally encoded audio. The audio signal output includes events that affect traffic. A scanner workstation is located physically remote from the processing unit and the scanner. The workstation includes an application for receiving the digitally encoded audio and decoding the digitally encoded audio to an original audio signal output of the scanner. A transport network having at least two edge nodes is in communication at one edge node to the processing unit to receive the digitally encoded audio and is in communication at the other edge node to provide the digitally encoded audio to the scanner workstation. A human agent receives the original audio signal outputs of the one or more scanners provided by the scanner workstation and converts the original audio signal outputs of traffic incidents into traffic report information.

In the first and second embodiments, the audio signal output of the scanner is delivered via a voice over IP process to the workstation in real-time, or in near real-time without human-perceptible delays associated with buffering.

In a third embodiment of the present invention, selected functions of a scanner are controllable from a remotely located site in real time. A processing unit is in communication with the input/output remote control port of a scanner. The processing unit includes a digital interface associated with the scanner and a remote control and video encoding application. A scanner control workstation is provided in a location physically remote from the processing unit and the scanner. The workstation includes a remote control and video decoding application. A transport network having at least two edge nodes is in communication at one edge node to the processing unit and is in communication at the other edge node to the scanner control workstation. The transport network, digital interface and remote control and video encoding and decoding applications allow the workstation to control and visually monitor selected functions and settings of a scanner in real time and to enter commands to selectively control functions and settings of the scanner in real time.

In all of the embodiments described above, the transport network may be a public or private network, or may be a switched network.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
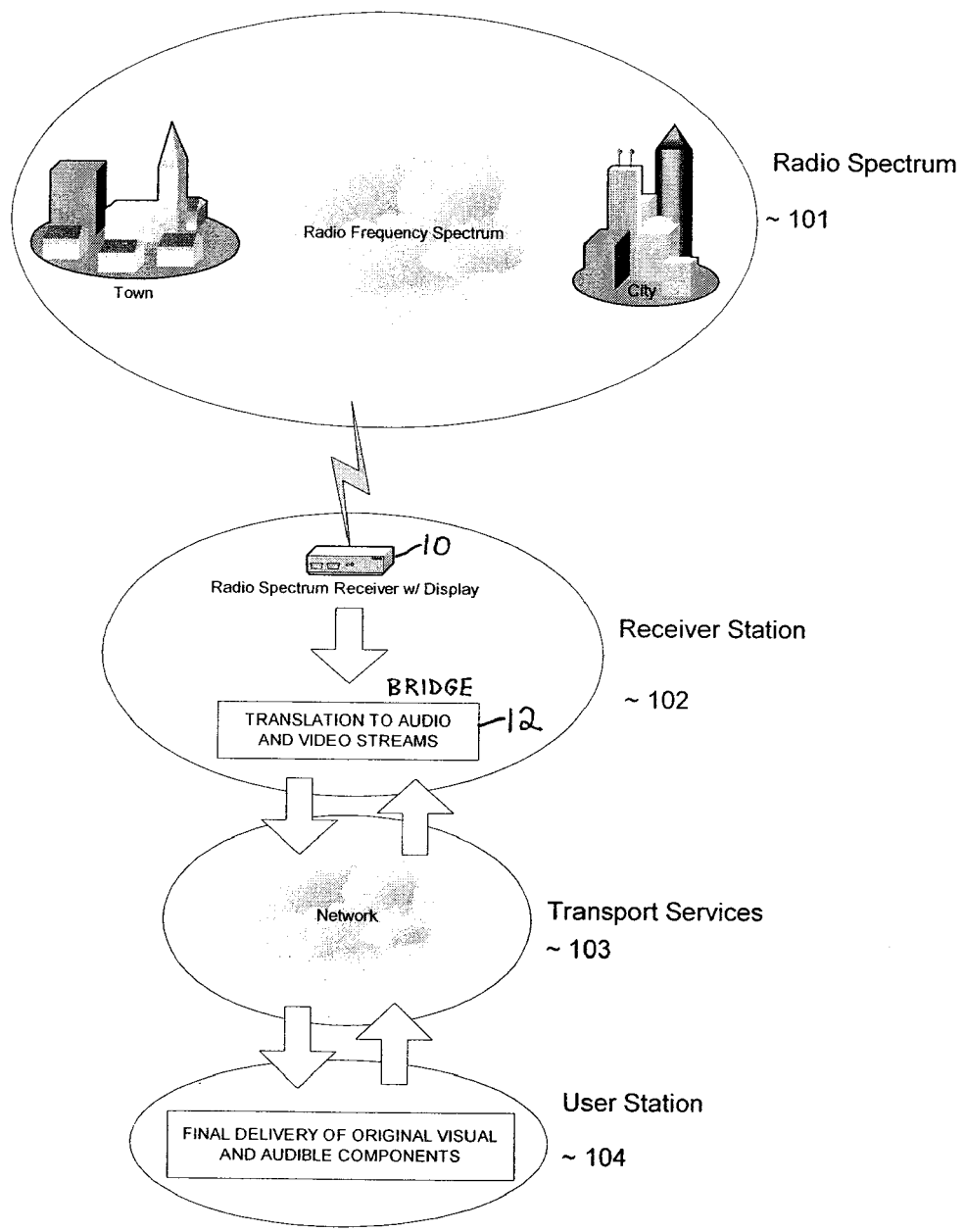
FIG. 1 is a high level overview of one preferred embodiment of the present invention.

Certain terminology is used herein for convenience only and is not to be taken as a limitation on the present invention. In the drawings, the same reference letters are employed for designating the same elements throughout the several figures.

1. Overview of Present Invention

The present invention is described in the context of a Remote Radio Spectrum Information Acquisition System (hereafter, "scanner system") which provides real-time remote acquisition of a scanner's audio signals and visual display, and real-time remote control of scanner operations (e.g., settings and functions). More specifically, the attributes of the scanner system include:
1. Real-time attribution to transmission source.
2. Real-time identification of frequencies spectrum
3. Real-time support of spectrum allocation to analog signals, trunk groups, digital signals
4. Real-time remote programming of reception
5. Real-time control functions supporting extended monitoring, signal interaction, noise reduction, and override capabilities.
6. Access local or remote.

One use of the scanner system is to gather information in a regional market by listening to geographically distant broadcasts available on radio spectrum frequencies. By synchronizing multi-spectrum monitoring, audio delivery, visual cueing, and control of spectrum reception, geographically independent persons can process scanner information as if they were physically present in the market. Thus, operators can gather information from public agencies and radio broadcasts from a remote market as if they were present in the market. The scanner system allows an operator full control of spectrum receivers and provides audio synchronized with visual information in real-time with control of scanning devices.

The real-time audio capabilities can also be characterized as being near real-time without human-perceptible delays associated with buffering used in streaming audio schemes.

High-level overviews and conceptual drawings (FIGS. 1-3) are provided as orientation and provide a basis for understanding detailed embodiment descriptions. Component level drawings (FIGS. 4-5) are provided to describe the major system elements. An embodiment of the scanner system is defined through the Hardware, Software and Component Diagrams (FIGS. 6-8 and 13) and corresponding descriptions. Field deployment options including switched circuit, dedicated circuit and multi-station configurations (FIGS. 9-11) are included to demonstrate implementations of the scanner system. Scanner interaction highlighting control requirements is included to demonstrate some of the required control functions (FIG. 12).

2. Detailed Disclosure of Present Invention

A scanner system is described herein, which expands the realm of the information gathering process to support geographically distant sources including interaction capabilities required to extend and enhance the acquisition of information from a remote location. Details descriptions cover reference implementations to further define the remote information gather system. Optional extensions and optional configurations are described to qualify the additional capabilities of the scanner system. As an introduction, high level concepts and architecture are provided to orient further descriptions.

Information is available from many sources as a transmitted signal in the radio spectrum. These broadcasts conform to local radio spectrum legislative requirements, which allocate frequencies, transmission modes and transmission power. As a result, many information sources are only available for reception within a limited distance from a transmitter. For example, public agencies such as Fire-Rescue and Police use radio spectrum broadcast systems to communicate information. Due to signal sharing requirements, availability of a given signal is present in a limited physical area. Many such signals exist and offer a wealth of publicly available information. A remote information gathering system offers the capability to process the large amount of information, which are not physically present to a user many miles away.

The Remote Radio Information Acquisition System is composed of several physical components. In addition, the physical location of these components is of vital importance to the operations of the system. FIG. 1 shows the major system elements which include Radio Spectrum (101) for a given locations, a Receiver Station (102) for the Radio Spectrum signals, Transport services (103), and User Stations (104). (Only one User Station (104) is shown in FIG. 1.) The Radio Spectrum signals are produced by both public and private agencies available for public consumption. The Receiver Station (102) is comprised of a RF spectrum receiver (10), alternately, referred to as scanner (10), and a bridge (12) that encodes and decodes audio, video, status and control. Transport Services (103) facilitate the exchanges of data from the Receiver Station (102) along with control functions with the User Station (104). The final system component is the User Stations (104) where an operator(s) receives data from the Receiver Station (102), obtains status, and influences control of the Receiver Station (102).

Figure 2:
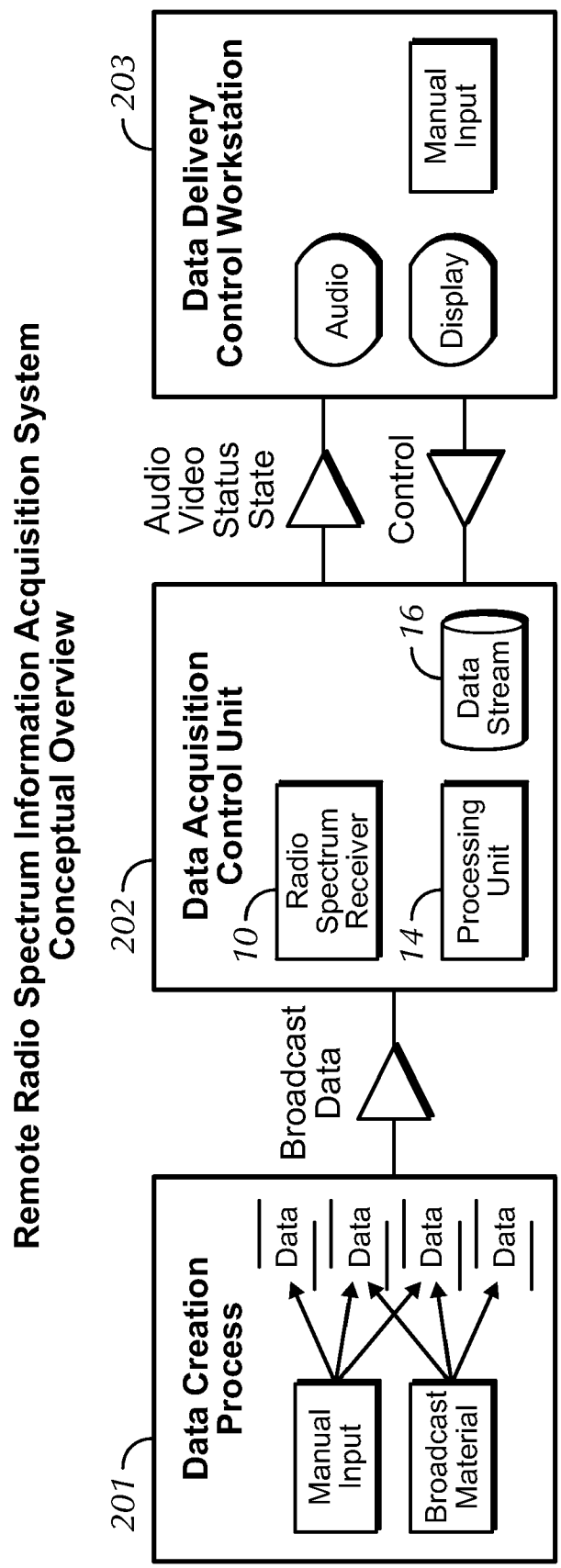
FIG. 2 is a conceptual overview of one preferred embodiment of the present invention

FIG. 2 is a conceptual overview which outlines the functional activities that occur within the scanner system. The Data Creation Process (201) occurs externally to the system. After the data is created, it is broadcast out. The Data Acquisition Control Unit (202) is the starting point of the scanner system. Within the Data Acquisition Control Unit (202), three primary functions occur: 1. execution of control functions in Processing Unit (14); 2. reception of broadcast data in the Radio Spectrum Receiver (10); and 3. creation of Data Streams (16). The Processing Unit (14) executes functions including manipulation of the Radio Spectrum Receiver (10), as well as other Receiver Station control functions. Data Streams (16) facilitate the encoding of Audio, Video, and Status information. The Data Acquisition Control Unit (202) receives input from the Data Creation Process (201) along with the Data Delivery Control Workstation (203). The Data Delivery Control (203) provides both visual and audio displays and also accepts input from users to actively control the Data Acquisition Control Unit (202) functions.

Figure 3:
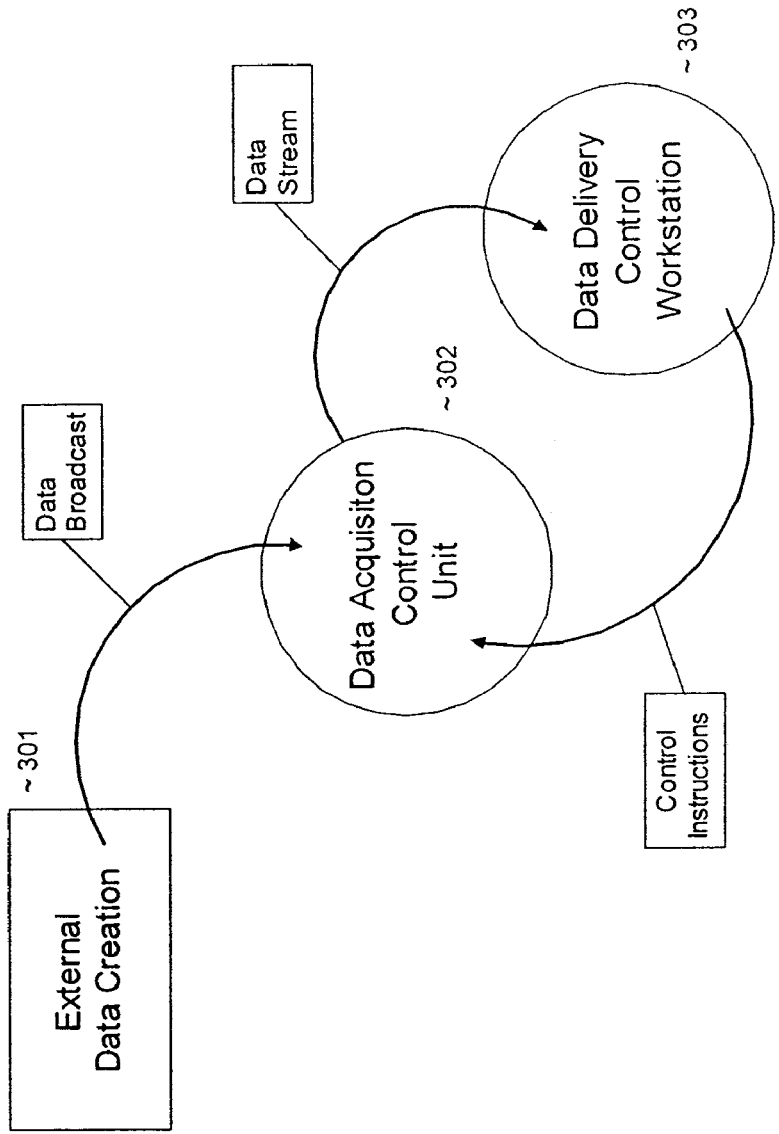
FIG. 3 is a dataflow overview of one preferred embodiment of the present invention

FIG. 3 is a data flow diagram that depicts information flow facilitated by the scanner system. External Data Creation (301) occurs from many sources. Police, Fire, Rescue, Ambulance, Travel advisory, emergency management, commercial radio, citizen band radio, amateur band radio, commercial TV, weather band, transportation and maritime band are a few of the potential sources of External Data Creation (301). The remote Data Acquisition Control Unit (302) collects the signals from external broadcast activity. Once acquired, this information is encoded and delivered to Data Delivery Control Workstation (303). Data Acquisition Control Unit (302) receives control commands from the Data Delivery Control Workstation (303). FIG. 3 represents a simplified exchange between system components. However, many parallel information flows between components are required in the actual scanner system. Additional details are outlined herein.

Figure 4:
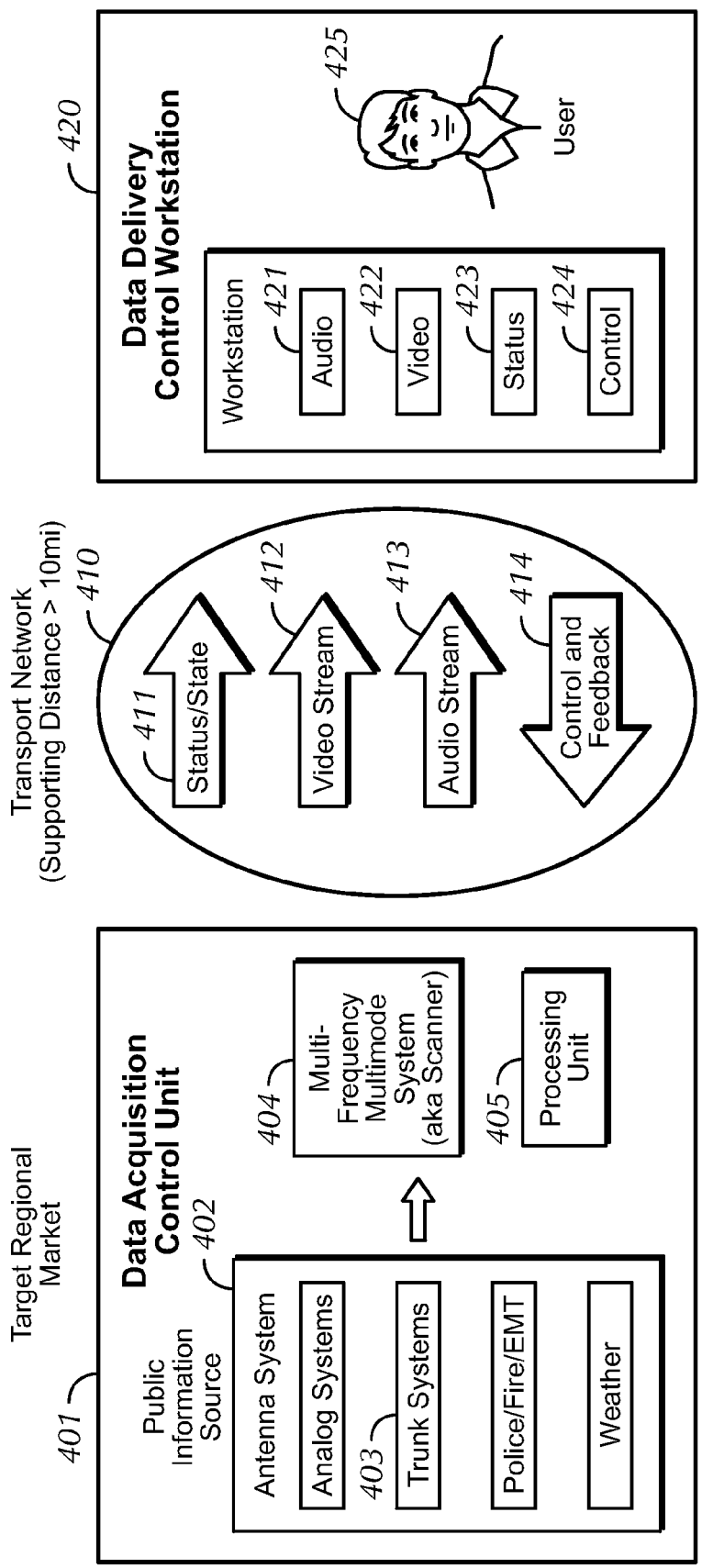
FIG. 4 is a system components view of one preferred embodiment of the present invention

The scanner system is comprised of three major components. FIG. 4 shows subcomponents of each major component. The Data Acquisition Control Unit (401) component is physically present in the city or town where the RF Radio Spectrum signals contain the desired content. An Antenna System (402) targets frequency ranges. The Antenna System (402) enhances RF Spectrum signals by maximizing usable signals. Multi-frequency/multimode systems (403) are connected to Antenna System (402) and scan the RF Spectrum. Scanning activities support a range of transmission systems including, but not limited to, analog systems, trunk transmission systems, and digital transmission systems. Multi-Frequency/Multimode Systems interface to Processing Unit (405) where audio encoding, video encoding and status information are processed. The Processing Unit (405) also accepts control activities from remote users. The Processing Unit (405) also interfaces to Transport (Transmission) Network (410). The Transport Network (410) provides a method of transporting data between the components of the Data Acquisition Control Unit (401) and the Data Delivery Control Workstation (420). The Transport Network (410) can take several different forms. The Transport Network (410) may be, but is not limited to, one of the following forms, a switched circuit network, a hardwired network, a private or virtual networks or a public network such as the Internet. The Transport Network (410) can be characterized as having "edge nodes." In the FIG. 4 embodiment, one edge node is connected to the Processing Unit (405) of the Data Acquisition Control Unit (401), and another edge node is connected to the Data Delivery Control Workstation (420). The Transport Network (410) supports exchange of Audio (411), Data (412), Streaming Data (413) and Control and Feedback (414). Data Delivery Control Workstation (420) provides the User (425) interface. The Data Delivery Control Workstation (420) accepts Audio (421) in both digital and analog streaming formats. Audio is decoded and presented as sound to the User (425). The Data Delivery Control Workstation (420) also presents Video (422) to the user. Video (422) is used to present activity from the Data Acquisition Control Unit (401). Video activity contains video images or pictorial representation of the Data Acquisition Control Unit (401) and its subcomponents (402 through 404). The Data Delivery Control Workstation (420) also presents Status (423) information to the User (425). Status information is available to monitor components and subcomponents of the Data Acquisition Control Unit (401). Status (423) provides either graphical or textual representation of activity within the components of the Data Acquisition Control Unit (401) to the User (425). The Data Delivery Control Workstation (420) components provide Control (424) to the User (425). Control (424) allows the User (425) to provide commands and feedback to the components of the Data Acquisition Control Unit (401). Control (424) provides manipulation of the Multi-frequency/Multimode Systems (404), Antenna System (402), Processing Unit (405), including, but not limited to, audio and video encoding, transport interfaces and self-control on the Data Acquisition Control Unit (401).

Figure 5:
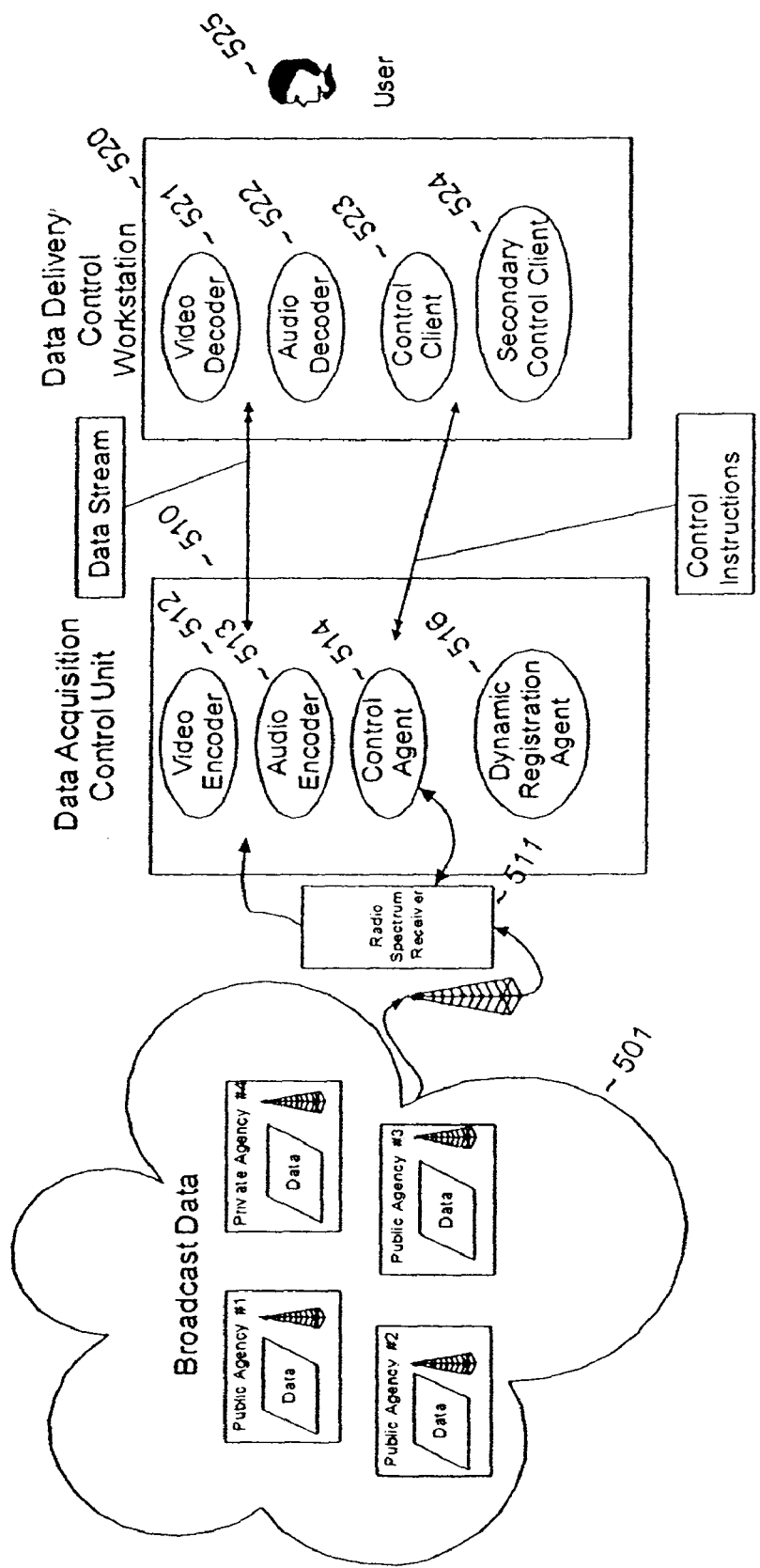
FIG. 5 is a process diagram in accordance with one preferred embodiment of the present invention.

FIG. 5 is a process diagram for the scanner system. The process diagram contains the Data Acquisition Control Unit (510) processes and Data Delivery Control Workstation (520) processes. Data Acquisition Control processes include Control (514), Audio Encoder (Codec) (513) and Video Encoder (Codec) (512) processes. The Audio Encoder (513) process encodes the Audio output from external Radio Spectrum receivers and forwards data over the transport network. Audio encoding requires near real-time encoding and release of audio data to ensure appropriate control activities are realized. Video Encoder (512) encodes video images and forwards encoded images over the network transport services. Video encoding requires near real-time encoding to ensure that appropriate control loop and feedback are realized. Control Agent (514) provides the execution of activities requested by a User (525) through the Data Delivery Control Workstation (520). The Control Agent (514) is divided into several subprocesses. A subprocess controls Radio Spectrum Receiver (511) device. Many Radio Spectrum Receivers (511) may be attached to the Data Acquisition Control Unit (510). One subprocess may control a single Radio Spectrum Receiver (511) or several Radio Spectrum Receivers (511). Several instances of Radio Spectrum Receiver Control subprocesses are possible. FIG. 5 depicts a sample configuration that supports multiple Data Acquisition Control Units (510) at a single receive site. A Control Agent (514) subprocess to manipulate the Control Unit (510) itself is present on the Data Acquisition Control Unit (510). The subprocess is the primary method to affect change and control on the process unit hardware system. The Control Agent (514) subprocess provides command shell access to operating system functions as a secondary method of affecting change and control. Control of an antenna system is provided as a subprocess of the Control Agent (514). A User Identification subprocess of Control Agent (514) is responsible for Authentication and Entitlements activity. Dynamic Registration Process (516) provides management when a switched transport service is used in place of a persistent transport service or used when a non-persistent network address is assigned to the Data Acquisition Control Unit (510). The Data Delivery Control Workstation (520) runs a Video Decoder (521) process, a Control Client (523) process, an Audio Decoder (522) process and a Secondary Control Client (524) process. The Video Decoder (521) process provides status and video decoding of video sent from the Data Acquisition Control Unit (510). The Control Client (522) process provides both graphical and textual interaction with Data Acquisition Control Unit (510). The Audio Decoder (522) process establishes a link with the Audio Encoder (513) in the Data Acquisition Control Unit (510). The Audio Decode (522) process produces audible sound to the User (525). Secondary Control Client (524) provides an alternate control path to facilitate control activities such as, but not limited to, operating system interaction and control of the Data Acquisition Control Unit (510). Secondary Control Client (524) is optional, but improves the reliability and troubleshooting activities of the Data Acquisition Control Unit (510).

Scanner System Embodiment

Figure 6:
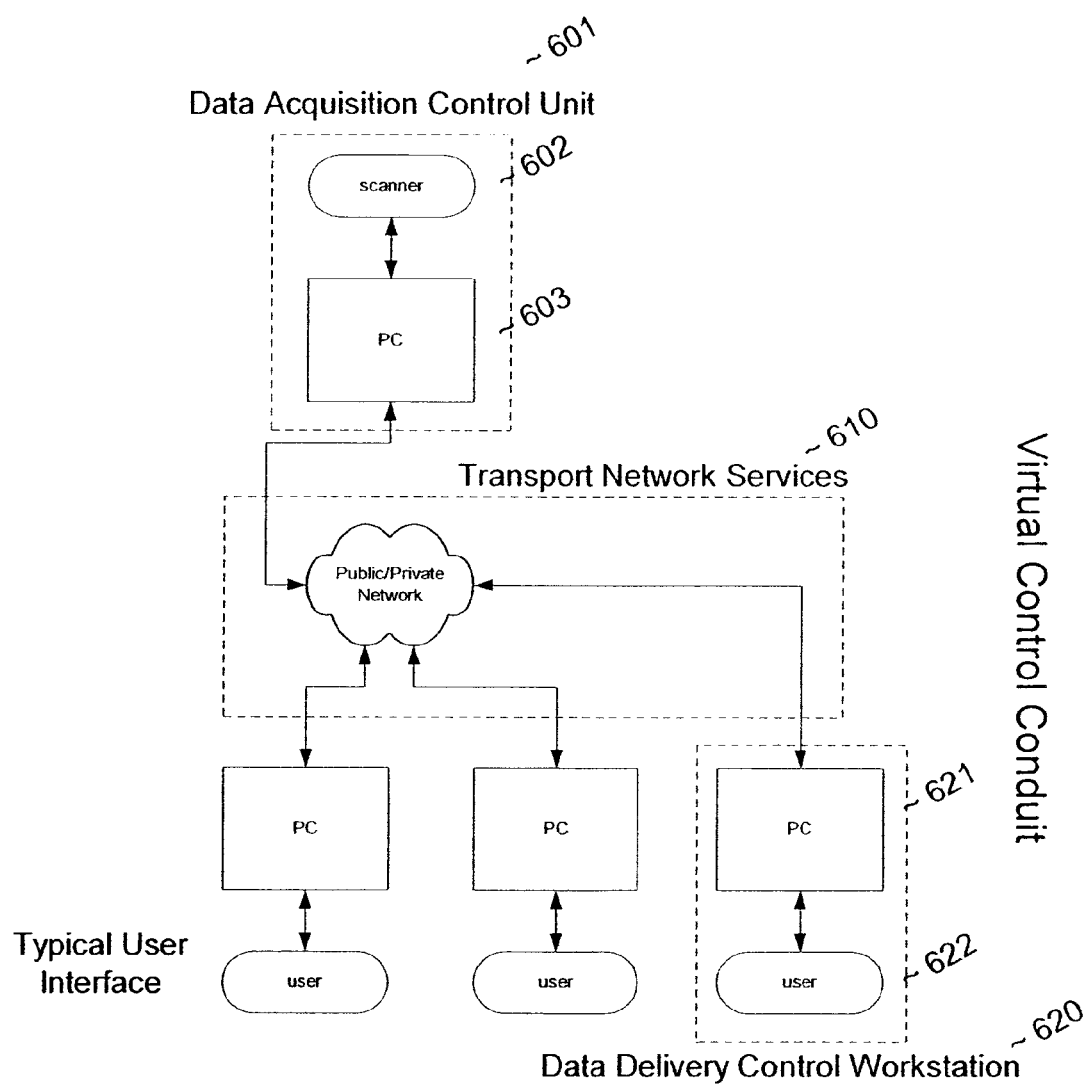
FIG. 6 is a hardware topology of one preferred embodiment of the present invention.
Figure 7:
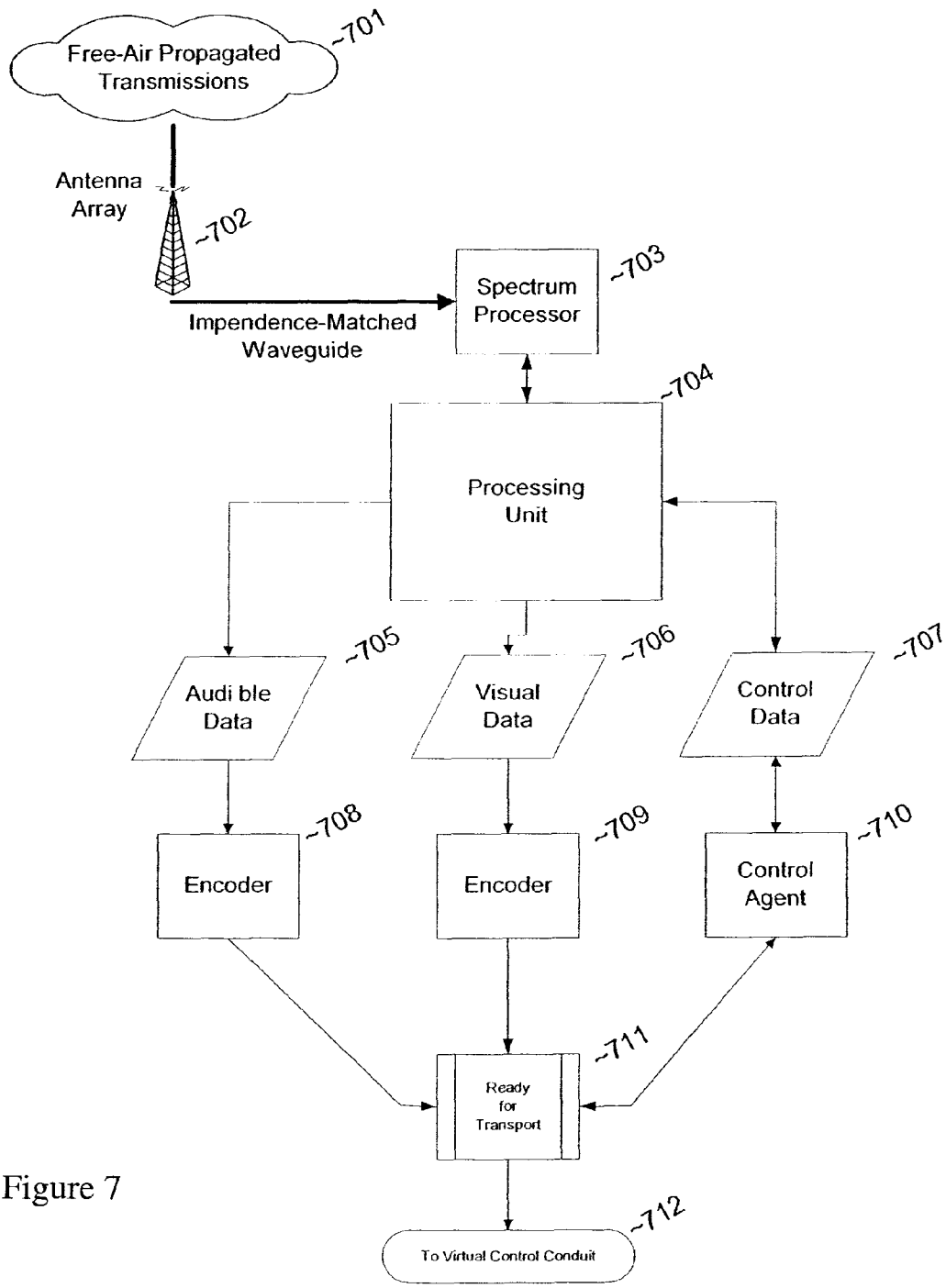
FIG. 7 is a radio spectrum receive site component diagram of one preferred embodiment of the present invention.
Figure 8:
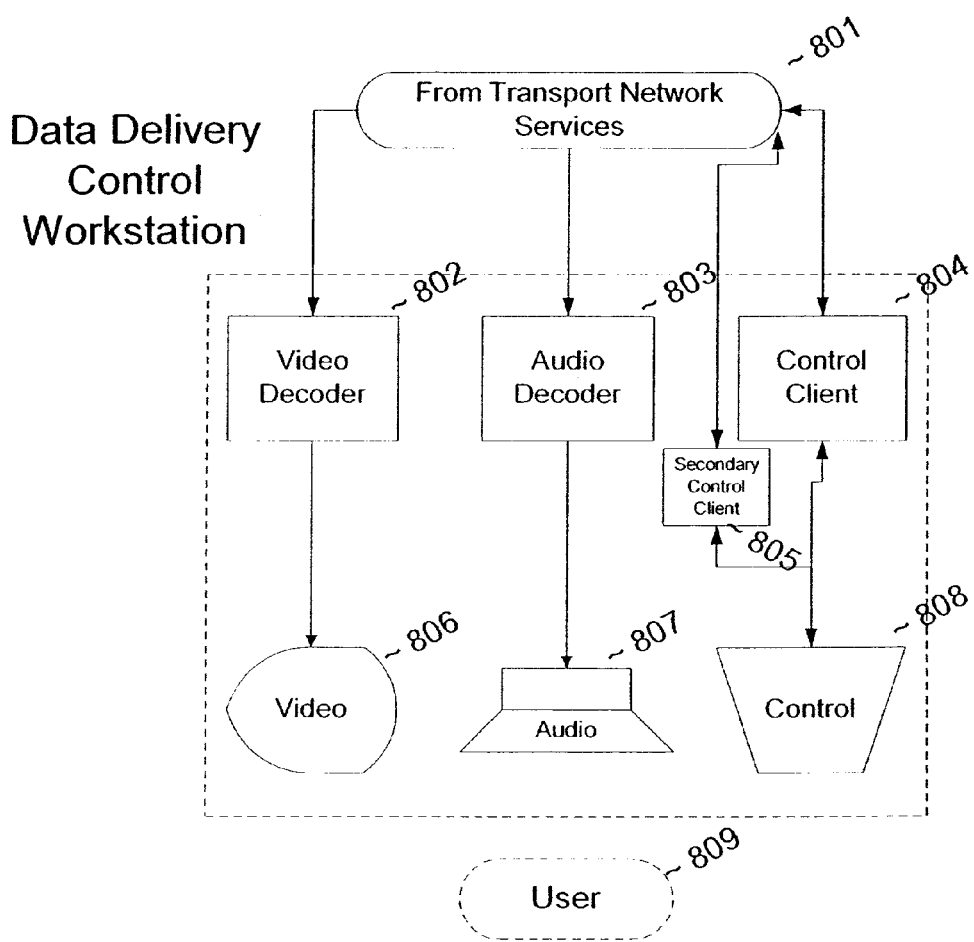
FIG. 8 is a control workstation component diagram of one preferred embodiment of the present invention.
Figure 9:
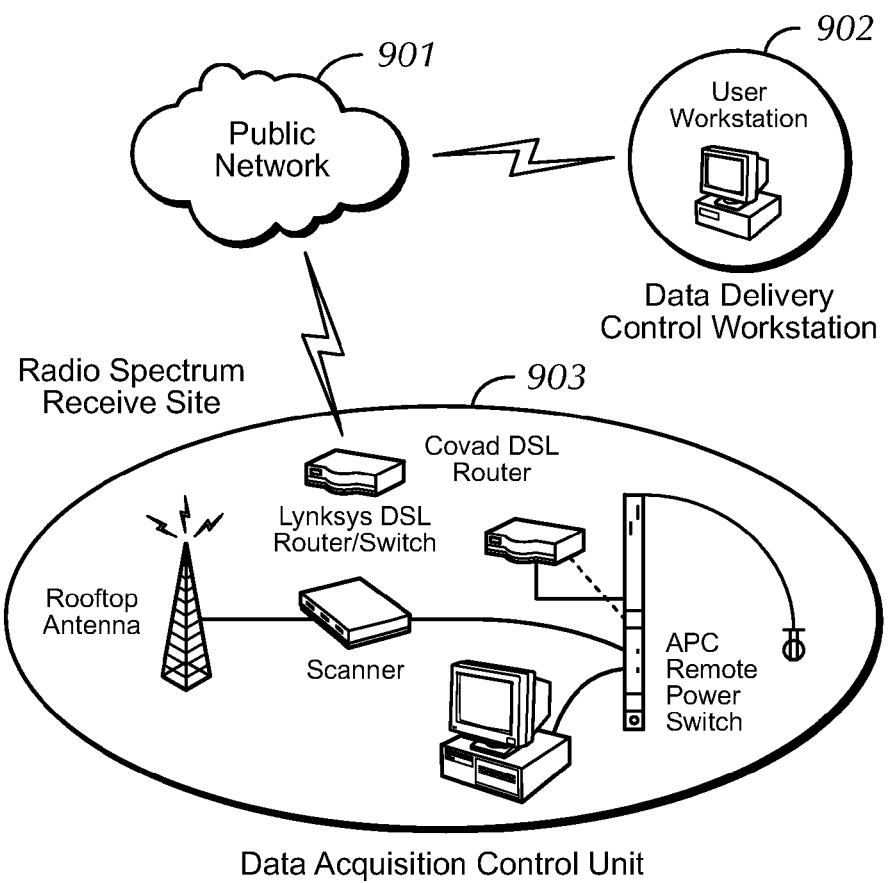
FIG. 9 is a dedicated circuit implementation of one preferred embodiment of the present invention.
Figure 10:
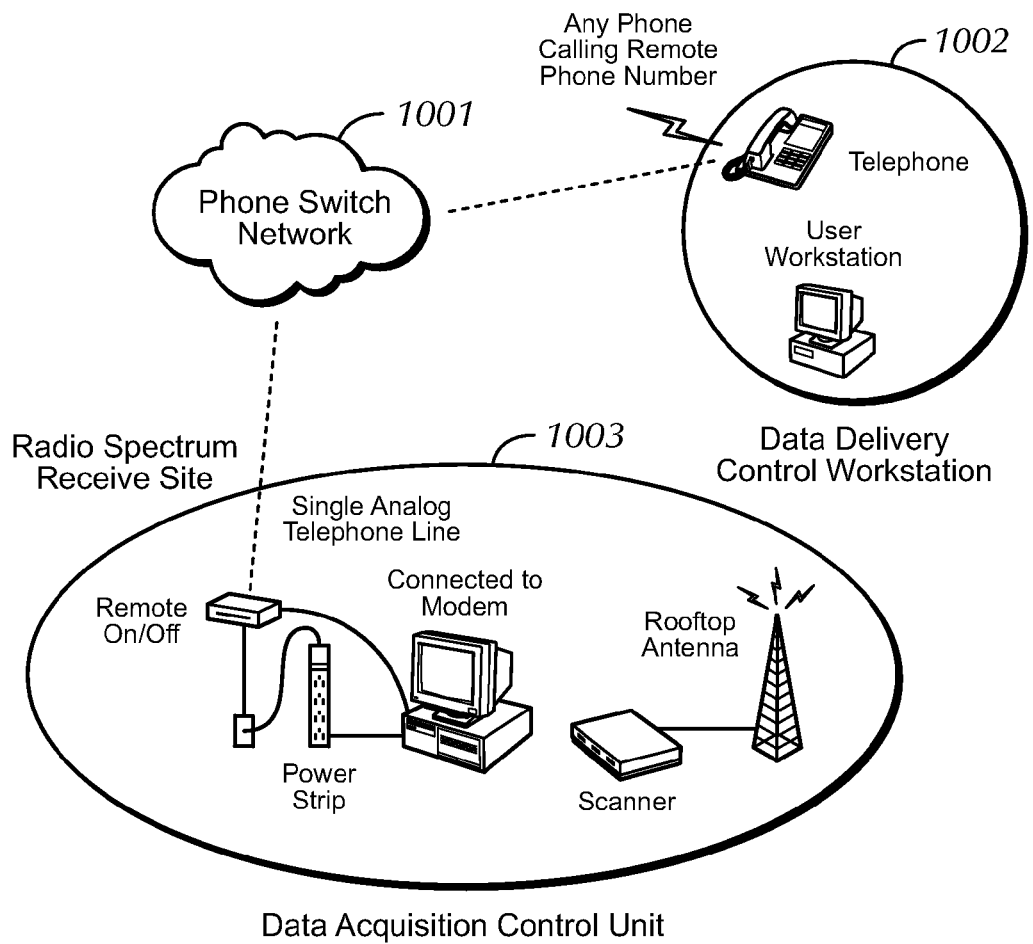
FIG. 10 is a switched circuit implementation of one preferred embodiment of the present invention.

FIG. 6 shows construction and assembly of a scanner system. More specifically, FIG. 6 shows a hardware topology of the scanner system. FIG. 7 shows a component diagram of a radio spectrum receive site. FIG. 8 shows a component diagram of a data delivery control workstation. FIG. 9 shows a dedicated circuit implementation, and FIG. 10 shows a switched circuit implementation.

FIG. 6 illustrates physical system components that comprise the scanner system. Major components of the hardware topology are the Data Acquisition Control Unit (601), the Data Delivery Control Workstation (620) and the Transport Network Services (610). In one simple form, the Data Acquisition Control Unit (601) is comprised of computer (603) and a scanner (602). The computer (603) hosts all software functions and the scanner (602) provides the platform for the Radio Spectrum processing. The Data Delivery Control Workstation (620) is a computer (621) running software with audio and visual capabilities, which provides the physical interface to the User (622). The Transport Network Services (610) provides the virtual conduit between the two-computer (603 and 621) systems. The Transport Network Services provide the connectivity over a hardwired network or over long-haul distances. In most instances, public or private network service providers supply Transport Network Services (610). Edge nodes are associated with the Transport Network Services (610) in the same manner as described above with respect to FIG. 4.

Applications of the concepts outlined for the scanner system have several possible incarnations. One embodiment of the scanner system is optionally implemented with custom software optimized for specific tasks. Another embodiment is implemented with general-purpose software packages, which supply required aspects of the target functionality. Functional aspects of the system remain the same in either implementation. General-purpose software packages provide required functionality, while custom software implementations optimize target functionality. Implementations of the scanner system described herein leverage several general-purpose software packages configured and integrated with other scanner system components.

FIG. 7 illustrates details of a radio spectrum receive site. An Antenna Array (702) is built in one of the following configurations. The first instance of an Antenna Array (702) is single antenna, which is either a simple magnetic mount or a more advanced multi-band unit. Advanced antenna arrays are constructed with frequency specific ranges, as well as directional antennas, which are selectable from the antenna farms based on transmission locations, atmospheric conditions, and target spectrum ranges. Antennas are capacitance matched to waveguide cables, which are fed into the Radio Spectrum Receivers. A Radio Spectrum Processor (703) is a self-contained unit that exposes a digital interface and audio interface. Examples of commercially available processors (703) include Icom scanners (e.g., Model Nos. PCR100 and PCR1000) and Uniden Bearcat scanners (e.g., Model BC780XLT), as discussed above. An audio interface from the Radio Spectrum Processor (703) to the Processing Unit (704) provides analog output, which is impendence matched to the audio encoder (705 and 708). Digital audio output from the Spectrum Processor (703) to the Processing Unit (704) is managed in the similar manner to analog, aligning interfaces or converting signals to analog format. The digital interfaces on Radio Spectrum Processors (703) to the Processing Unit (704) support status information, state information and support real-time configuration changes. Digital interfaces on the Radio Spectrum Processor (703) can be a serial interface such as IEEE RS-232C or a network enabled unit such as IEEE 802. The Processing Unit (704) locally attaches to the digital interface of the Radio Spectrum Processor with a serial or network cables. The Processor Unit (704) is locally connected to the audio output of the Radio Spectrum Processor (703). The Processor Unit (704) incorporates an input audio line, which provides the hardware component of the Audio Encoding (705 and 708). The digital interface of the Processor Unit (704) and Spectrum Processor (703) supports a messages exchange to affect changes and query status and state.

The Processor Unit (704) is hosted on a common PC platform. The Data Acquisition Control Unit (601) uses a PC running, but not limited to, Microsoft Windows 2000 Operating System as the platform to physically host software and supply processing required at the Radio Spectrum Receive Site. The Processor Unit (704 through 711) is connected to transport services installed at the Radio Spectrum Receive Site. Physical connections to supply transport services (711) that are supported, but not limited to, network-based (e.g., IEEE 802) or switched services such as ISDN or a Plain Old Telephone Service (POTS) line.

Software on the Radio Spectrum Receive Site (704 through 711) provides the audio encoding (708) of the Radio Spectrum Processor, Video Encoding (709) and Control agents (707). Audio Encoders (705) leverage sounds system hardware found on PC's. Standard audio and streaming software will not support the requirements of the scanner system. Audio software must perform in real-time without buffering found in standard streaming audio (705 and 708) software. One preferred embodiment of the scanner system leverages conventional Phone to PC audio software (705 and 708). Several audio encoding systems are available to facilitate the real-time audio link required by the scanner system. Off-the-shelf audio encoding software commercially available from BuddyPhone (BuddyPhone Inc., San Diego, Calif.), Net2Phone® (Net2Phone Inc., Newark, N.J.), and PC2Phone (software available from iConnectHere, a consumer division of deltathree, inc., New York) support appropriate PC-to-PC Audio Links. One particularly preferred embodiment, described in more detail in FIG. 13, uses the BuddyPhone VoIp (voice over IP) solution. The scanner system leverages the local PC Display on the Processing Unit (704) to facilitate high performance Video encoding (706 and 709). Initial implementation of the scanner system leverages a product that combines both Video encoding (706 and 709) and portions of the control agent (707). The Video display (706 and 709) and portions of the control agent (710) are facilitated by commercially available products, which provide remote control. Remote control functionality provided by software packages such as, but not limited to, pcAnywhere® (Symantec Corp.), Remotely Possible (Avalon), and Virtual Network Control (VNC) (freeware, downloadable from AT&T Laboratories Cambridge web site, http colon slash www dot uk dot research dot att dot corn slash vnc slash index dot html), hereafter referred to as "Remote-Control-Packages." Video Encoding (706 and 709) activity is intrinsic to these Remote-Control-Packages. Current Remote-Control-Packages have many operational issues that must be overcome through other means. A Secondary Control Agent (710) is preferably installed to provide command line access to the system in the event that the Remote-Control-Package is hung or disabled. The Secondary Control Agent (710) is a Secure Shell (SSH). SSH is available from several public sources such as OpenSSH (additional information available from: http colon slash www dot openssh dot corn slash) and GNU as a public domain package. A remotely accessible power reset device is also incorporated into Radio Spectrum Receive Site as yet another control function assuring recovery and reset capabilities of the Radio Spectrum Receive Site. Another Control Agent is required to operate and interact with the Radio Spectrum Processors. A Control Agent (710) must be developed or acquired that matches the Radio Spectrum Processor (703) Digital Interface and logical message interface. Two pre-built software packages are available to operate with the three Radio Spectrum Processors (703) defined above, namely, WinScan 780 software for use with the Uniden Bearcat scanner, and software associated with the Model No.

IC-PCR100 and PCR1000 scanners from Icom Inc. This software is installed on the Processing Unit (704). Alternatively, custom Control Agent (710) implements an interface such as a message protocol to interact with the Radio Spectrum Processor (703).

Table 1 defines an example message format to interact with Radio Spectrum Processor (703). All externally visible or accessible Control Agents (710) provide security through authentication and entitlements controls. One embodiment of the scanner system leverages operating system users and passwords, but the scanner system is not limited to this approach.

TABLE 1

Example Message formats for interface and controlling of Radio Spectrum Processor
Command Syntax <command><Optional Parameters><Carriage Return>
Commands Erase/Clear Memory
Confirm/Set Beep Alert/Status Bit/Choose Banks/CTCSS Decode/Trunk ID Monitor/CTCSS Detection function
Request/Set CTCSS tone frequency/CTCSS function/Delay/SKIP function/Lock/Find Mode/Priority Channel/Bank/Tune Frequency/Radio Group Name/Priority Indicator/Receiver Modulation/Active Bank/Step Size/Current Trunked Mode/Weather Search/ID from talk group/Trunk ID Monitor
Read/Register/Delete Lockout Registers
Inspect Mode
Read/Write Frequency Channel
Priority Scan function
Inspect/Set Squelch Notify Mode
Signal Strength
Request Radio System Information
Request Squelch Status
Get/Register frequencies in search skip
Query/Set Control Channel Trunking Mode
Inspect Currently Monitored Channel The Radio Spectrum Receive Site runs software to facilitate registration of dynamic network addresses (515) when the transport services are deployed on a non-deterministic address. Network addresses assigned by Transport Network Service (712) providers can be dynamic, similar to Dynamic Host Control on a local LAN. In this configuration, the Processor Unit (704) at the Radio Spectrum Receive Site uses a registration service to associate the currently assigned IP address to a Domain Name Services (DNS) name. Service providers such as Dynamic DNS Network Services LLC. or The Art of DNS are examples of Internet-based services that provide Domain Name Service for non-deterministic or dynamically assigned IP addresses. Using a well-defined name, the Data Delivery Control Unit can find the network location of a unit even if the network address is floating or changing.

Transport Network Services (link facilitating 712 to 801) are implemented in any one of the following ways. Transport services options include, but are not limited to, private or public network connections as well as the Internet. Network connections support both hardwired (FIG. 9) or switched services (FIG. 10). Both the Data Acquisition Control Unit (601) and the Data Delivery Control unit leverage network interfaces on the local network segments. TCP/IP services or other transport service provide the necessary data transport. An alternative configuration can leverage switched network services on a dial-up line. Switched services must invoke Point-to-Point Protocol or a similar TCP/IP Network stack. Network stack implementations on the Processing Unit (704) or in dedicated communication gear facilitate transport services. Standard Network services including Domain Name Service (DNS), Internetworking Protocols, Routing, and Dynamic Host Control Protocol (DHCP) are within the scope of standard network services. Other transport services are supported since transport services are transparent to the application.

Switched Network Services using POTS lines or ISDN lines provide low bandwidth connections. The scanner system adjusts automatically to the bandwidth available. Manual configuration of Audio Encoding (705) levels of 8 bit or 4 bit levels enhance performance on marginal network connections. Many switched Transport Networks and some hardwired Transport Networks services operate with Dynamic IP address allocation. The Data Acquisition Control Unit (601) is configured to publish an IP address to a DNS name. Dynamic Registration implements the requirement for non-deterministic IP addressing.

Figure 11:
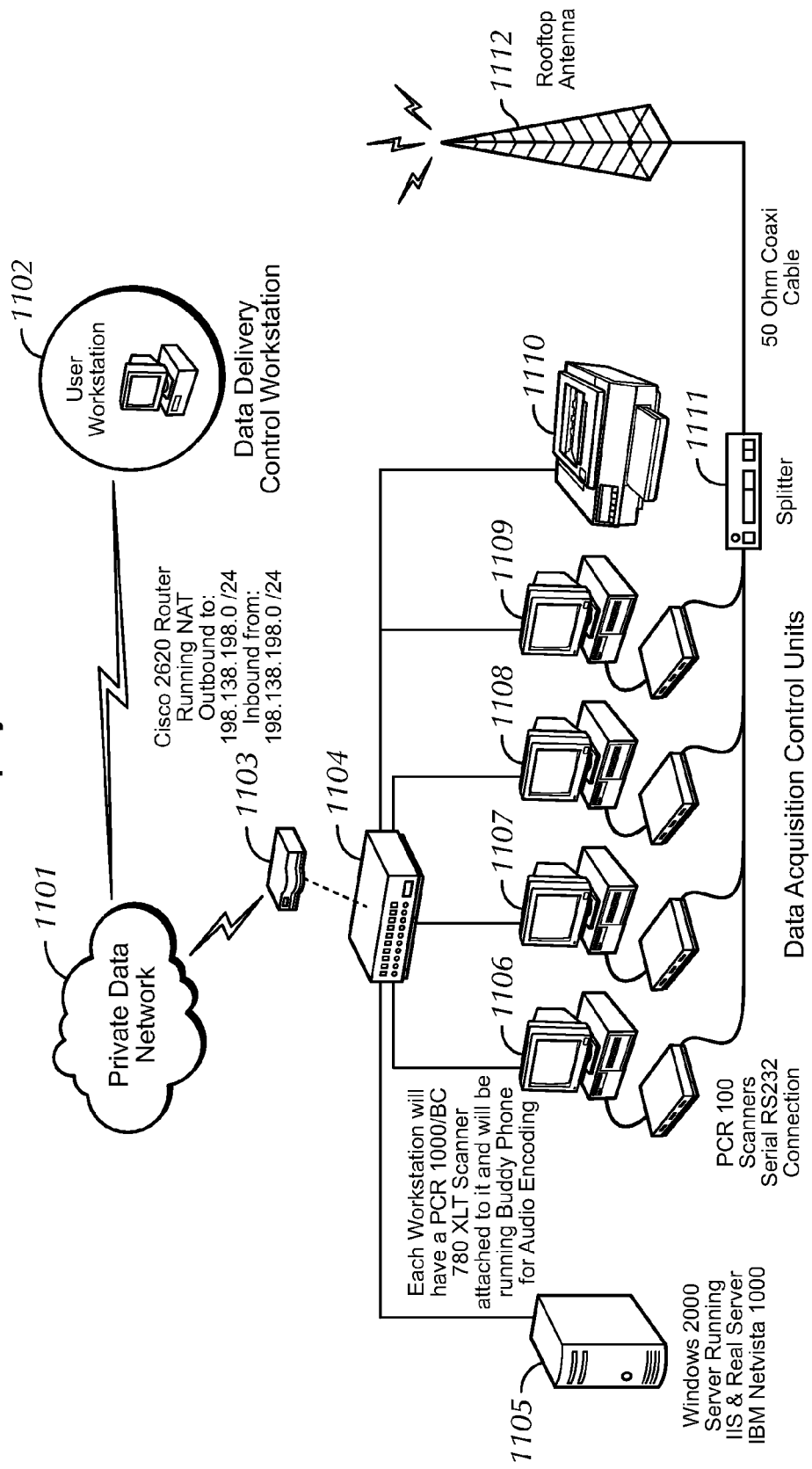
FIG. 11 is a multi-stations deployment of one preferred embodiment of the present invention.
Figure 12:
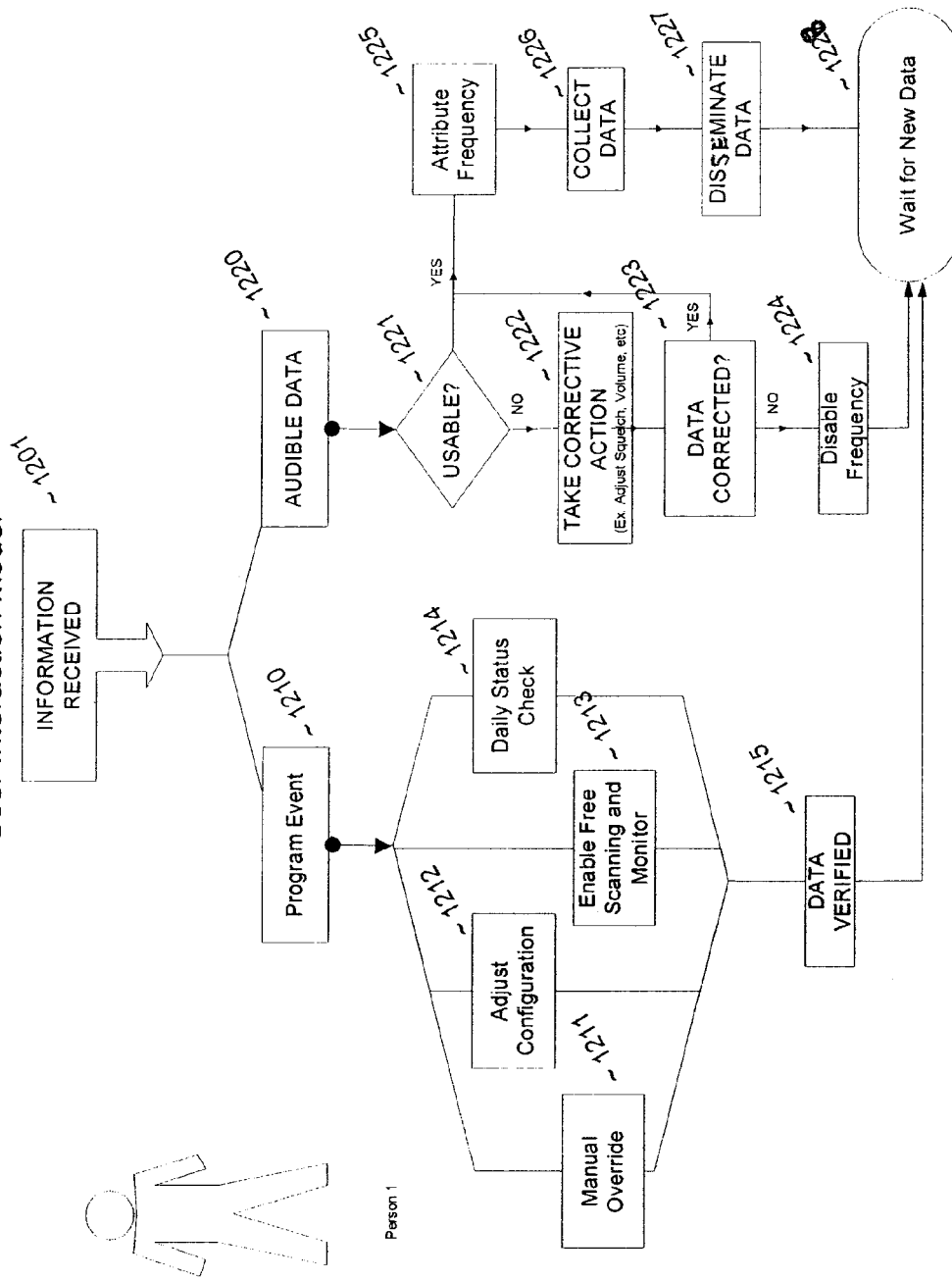
FIG. 12 is an operator interaction model of one preferred embodiment of the present invention.

FIG. 11 shows a multi-station deployment of the scanner system having a plurality of data acquisition control units. Specific hardware and software products are shown in FIG. 11 for implementing one embodiment of a multi-station system.

FIG. 8 shows a data delivery control workstation. The workstation is implemented with software that integrates with the Data Acquisition Control Unit (601). Software implementation of Audio Decoding (803), Video Decoding (802) and Control Clients (804 and 805) are achieved on the Data Delivery Control Workstation. In one preferred embodiment of the scanner system, the workstation is a standard PC running a Microsoft Windows 2000 Operating System. The workstation may run other types of Windows and non-Windows operating systems. Additional software running on the Data Delivery Control Workstation includes Control Client (804), Secondary Control Agent (805), and Video Decode (802) and Audio Decode (803). The Control Client (804) and Video Decode (802) are facilitated through the client agent of the Remote-Control-Package. Video decoding provides access to the Radio Spectrum Processor status. The Control Client (804) of the Remote-Control-Package is the user interface providing control of the Radio Spectrum Processor. The Control Client (804) delivers WYSIWYG application control. Custom control agents (replacement 804 software) offer efficiencies over the standard Remote-Control-Package applications, whereas standard Remote-Control-Packages offer convenient implementation. Secondary Control functions (805) are implemented using, but not limited to, Secure Shell (SSH). Audio decode (803) activity is performed using PC-to-PC audio link software that is compatible with the Audio Encoder (708) Software of the Data Acquisition Control Unit (601). PC-to-PC Audio Link software initiate a connection with the Data Acquisition Control Unit (601) via a predetermined DNS name. The PC-to-PC Audio Link software provides sound quality controls and delivers audio with little to no delay, which is very important when interacting with the Radio Spectrum Receive Site. The predetermined DNS name allows for the contracting of Data Acquisition Control Agents (710), as well as other services. The Dynamic Registration Agent will associate the Radio Spectrum Receive Site with any dynamically assigned network address, which is used to support the switched Transport Network services.

Operation of the scanner system provides a tightly coupled interaction required to process the large amounts of information disseminated over the radio broadcast systems. FIG. 12 shows User Interaction models that are feasible when using the present invention. Once built, the Data Acquisition Control Unit and the Data Delivery Control Workstation support a tight interaction required to effectively scan many frequencies and broadcast groups. FIG. 12 highlights the type of interaction supported by the scanner system. After the Data Acquisition Control Unit and the Data Delivery Control Workstation establish an active session, a User processes audio and visual information provided through the system. Program Events (1210) are performed as if the Radio Spectrum Receiver were local. Users await Audible data: (1220) and react on the quality of data (1222 through 1224) and process many frequencies through visual confirmation (1225) as audio information arrives. The scanner system supports, but is not limited to, the following interactions set forth in Table 2. A User listens to information and initiates one of the following actions:

TABLE 2

Audio Events and Interaction

| Audio Event | Action |
| --- | --- |
| Broadcast received | View Frequency, Attribute source of audio, Log and process audio information |
| Important broadcast received | Lock frequency, Suspend scanning, Log and process audio information, Wait for conversation/announcement to complete, Release lock and resume scanning |
| Noise—Received Once | Ignore |
| Noise—Received repeatedly | Adjust signal strength (Squelch) or Remove frequency from scanning rotation on a temporary basis. |
| Individual Signal Poor | View signal strength, consider moving signal to another Radio Spectrum Processor where signal strength is amplified. |
| All Broadcasts are weak with poor atmospheric conditions | Adjust audio feed volume up. |
| All broadcasts are indistinguishable with acceptable volume | Adjust Radio Spectrum Processor audio output to lower volume. |

Using visual feedback, a User invokes controls to adjust the Radio Spectrum Processor or Processor Unit. Visual feedback loop is also leveraged as a secondary information source. Administration and technician activities are examples of events requiring control, which are driven by visual feedback. Table 3—Visual Events and Interaction, provides a non-exhaustive list of examples of events and controls leveraging video data.

TABLE 3

Visual Events and Interaction

| Event | Control | Visual Data |
| --- | --- | --- |
| Daily operational frequency inventory check | Pull frequency banks, Trunk groups, and other configuration Information from running configuration | Visually inspects enabled/disabled scanning banks and trunk group status |
| New broadcast source | Add frequency/trunk group description and assign scanning priority | Configuration editor, and test operation, Verify reception and Signal strength and quality. |
| Weather check | Manually adjust to local weather band | Verify frequency |
| Market survey | Allow free scanning | Wait for reception and verify frequency/trunk group. |
| Primary frequency validation | Manually adjust to primary banks and verify receptions | Configuration verification, Signal strength check and Audio quality synchronization. |
| Radio Spectrum Receive Site suspends or unresponsive | Attach to Secondary Control Agent and reset Remote-Control-Package | Wait for Control Client to attach to the Control Agent |

Figure 13:
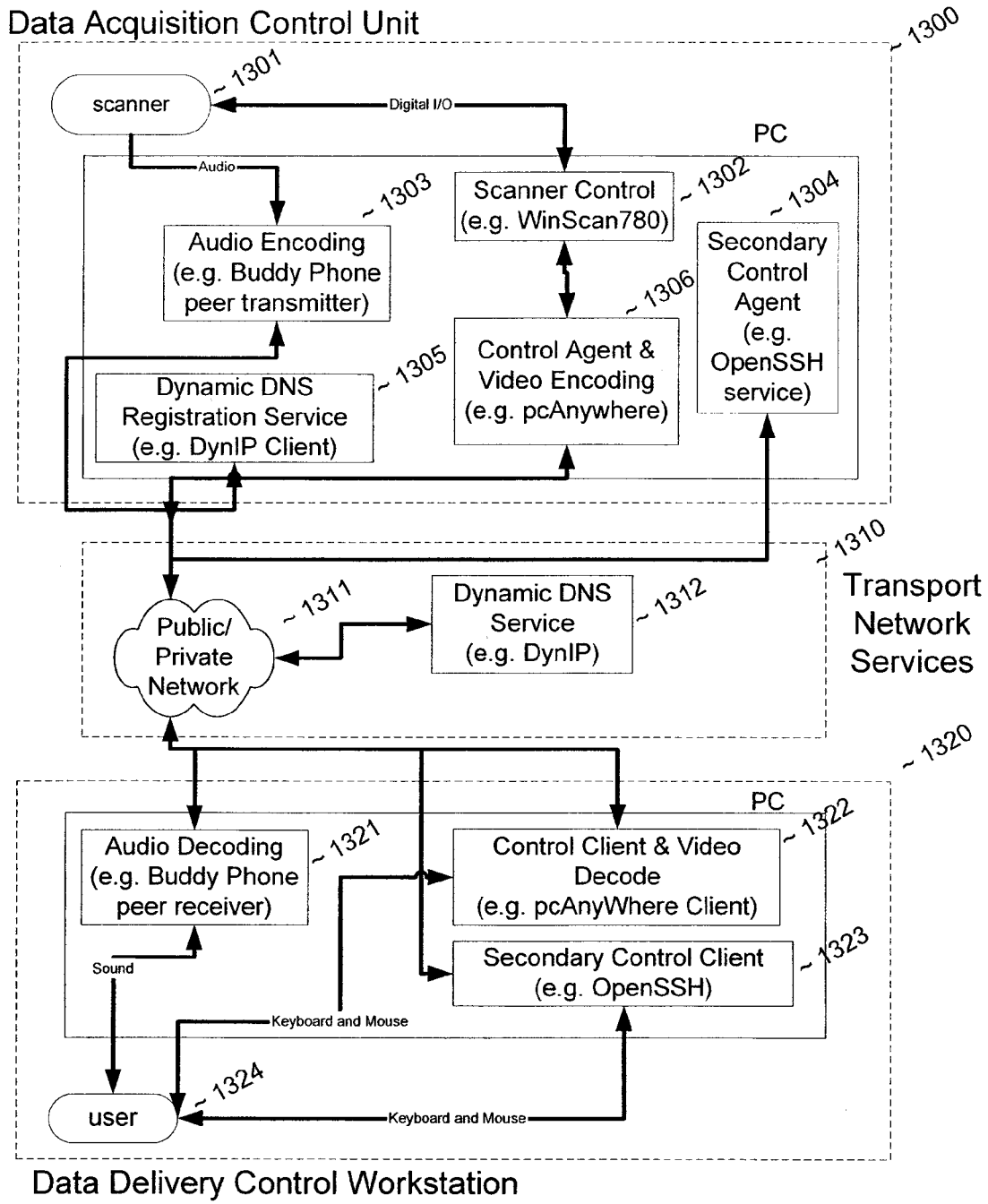
FIG. 13 is a hardware topology of FIG. 6 which shows exemplary software elements (programs) that execute in the different hardware elements.

FIG. 13 is a hardware topology of FIG. 6 which shows exemplary software elements that execute in the different hardware elements and the locations in which they exist. The scope of the present invention includes software elements that are functionally equivalent to the exemplary software elements. These software elements were described above and thus no additional description is provided herein. FIG. 13 merely clarifies where the various software elements execute in one preferred embodiment of the scanner system.

Figure 14:
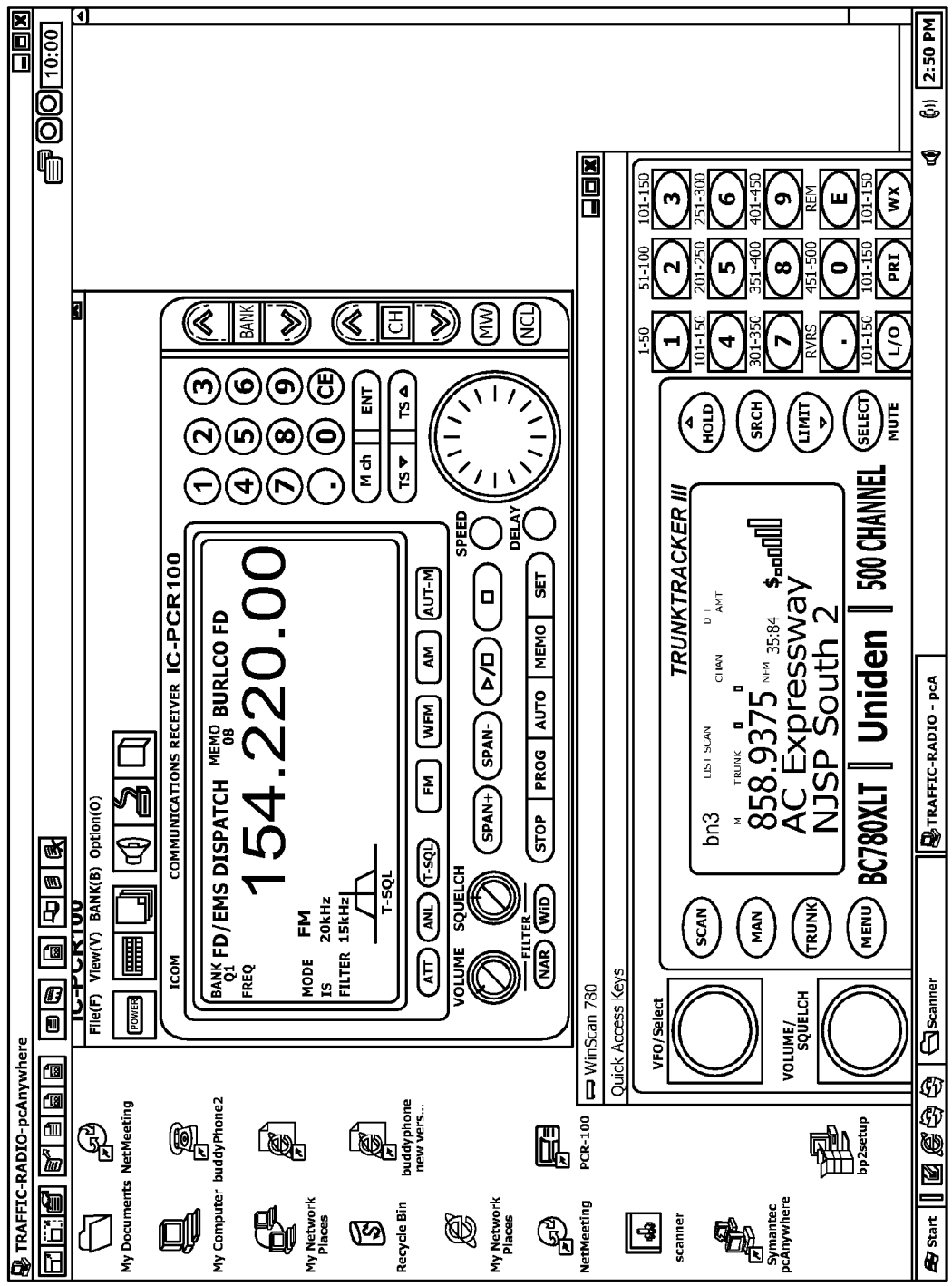
FIG. 14 shows a user interface screen in accordance with one preferred embodiment of the present invention for remote monitoring and controlling of two different types of scanners.
Figure 15:
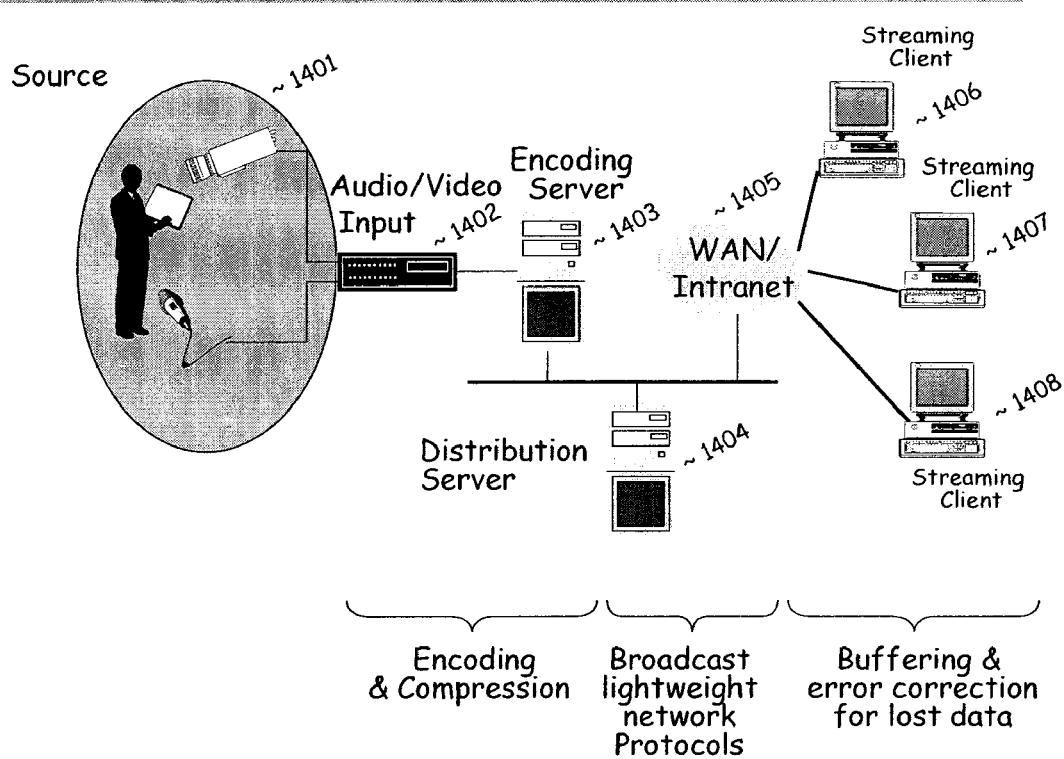
FIG. 15 shows a typical prior art architecture for streaming audio and video data.
Figure 16:
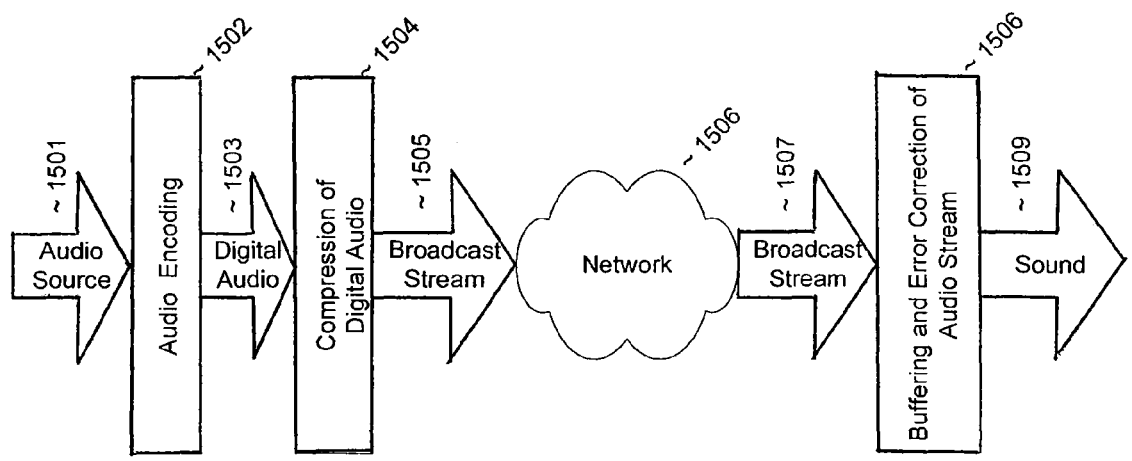
FIG. 16 shows an overview of the typical processing requirements to create and distribute an audio stream in accordance with the prior art.

FIG. 14 shows a user interface screen in accordance with one preferred embodiment of the present invention for remote monitoring and controlling of two different types of scanners, namely the Uniden Bearcat and Icom scanners discussed above. The user interface screen allows a user at the Data Delivery Control Workstation to view scanner data in real-time and to control scanner operations in real-time. Scanner audio data is also available in real-time (or in near real-time without delays associated with buffering used in streaming audio and video schemes) at the Data Delivery Control Workstation, as discussed extensively above, by using audio encoding/decoding and audio transport processes.

One preferred use of the scanner system is for a user to monitor a remotely located scanner or bank of scanners for events that affect traffic and to convert the events into traffic report information for creation of traffic reports. If an important transmission is heard relating to an event that affects traffic, the operator at the workstation can use the remote control application software to lock into the current frequency of the scanner and acquire additional information regarding the event that may be subsequently transmitted and picked up by the scanner on the current frequency.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

The invention claimed is:

1. A computer-implemented apparatus for receiving audio signals from a scanner, the apparatus comprising:
   (a) a processing unit which receives an audio signal output of the scanner and prepares the audio signal for transmission over a network by encoding the audio signal output of the scanner to digitally encoded audio;
   (b) a scanner workstation physically remote from the processing unit and the scanner, the workstation including an application for receiving the digitally encoded audio and decoding the digitally encoded audio to an original audio signal output of the scanner; and
   (c) a transport network having at least two edge nodes, the transport network being in communication at one edge node with the processing unit to receive the digitally encoded audio and being in communication at the other edge node with the scanner workstation to provide the digitally encoded audio to the scanner workstation in real-time, or in near real-time, and without buffering of the digitally encoded audio.

2. The apparatus of claim 1 wherein the processing unit is physically connected to the audio signal output of the scanner.

3. The apparatus of claim 1 wherein the transport network is physically connected at the one edge node to the processing unit and is physically connected at the other edge node to the scanner workstation.

4. The apparatus of claim 1 wherein the transport network is a public or private network.

5. The apparatus of claim 1 wherein the transport network is a switched network.

6. The apparatus of claim 1 wherein the transport network is a wireless network.

7. The apparatus of claim 1 wherein the transport network delivers the digitally encoded audio via a voice over IP process.

8. The apparatus of claim 1 wherein the voice over IP process is unidirectional.

9. A computer-implemented apparatus for controlling and monitoring selected functions and settings of a scanner in real time, the scanner including an input/output remote control port, the apparatus comprising:
   (a) a processing unit in communication with the input/output port of the scanner, the processing unit including:
      (i) a digital interface associated with the scanner, and
      (ii) a remote control and video encoding application;
   (b) a scanner control workstation physically remote from the processing unit and the scanner, the scanner workstation including a remote control and video decoding application; and
   (c) a transport network having at least two edge nodes, the transport network being in communication at one edge node with the processing unit and being in communication at the other edge node to the scanner control workstation, wherein the transport network, digital interface and remote control and video encoding and decoding applications allow the workstation to control and visually monitor selected functions and settings of a scanner in real time and to enter commands to selectively control functions and settings of the scanner in real time.

10. The apparatus of claim 9 wherein the transport network delivers the digitally encoded audio via a voice over IP process.

11. The apparatus of claim 10 wherein the voice over IP process is unidirectional.

12. The apparatus of claim 9 wherein the processing unit receives an audio signal output of the scanner and prepares the audio signal for transmission over a network by encoding the audio signal output of the scanner to digitally encoded audio, and the workstation includes an application for receiving the digitally encoded audio and decoding the digitally encoded audio to an original audio signal output of the scanner, and the transport network receives the digitally encoded audio and provides the digitally encoded audio to the scanner workstation in real-time, or in near real-time, and without buffering of the digitally encoded audio, wherein the audio signal output of the scanner is synchronized with the visually monitored functions and settings.

13. The apparatus of claim 9 wherein the processing unit is physically connected to the input/output port of the scanner.

14. The apparatus of claim 9 wherein the transport network is physically connected at the one edge node to the processing unit and is physically connected at the other edge node to the scanner workstation.

15. The apparatus of claim 9 wherein the transport network is a public or private network.

16. The apparatus of claim 9 wherein the transport network is a switched network.

17. The apparatus of claim 9 wherein the transport network is a wireless network.

18. The apparatus of claim 9 wherein the remote control application in the workstation allows the workstation to enter commands to control volume of the scanner.

19. The apparatus of claim 9 wherein the remote control application in the workstation allows the workstation to enter commands to control squelch of the scanner.

20. The apparatus of claim 9 wherein the remote control application in the workstation allows the workstation to enter commands to control the frequency or channel of the scanner.

21. The apparatus of claim 9 wherein the remote control application in the workstation allows the workstation to enter commands to control scanning banks of the scanner.

22. A computer-implemented apparatus for creating traffic report information using one or more scanners, each scanner including an audio signal output, the apparatus comprising:
   (a) a processing unit which receives an audio signal output of the scanner and prepares the audio signal output for transmission over a network by encoding the audio signal output to digitally encoded audio, the audio signal output including events that affect traffic;
   (b) a scanner workstation physically remote from the processing unit and the scanner, the workstation including an application for receiving the digitally encoded audio and decoding the digitally encoded audio to an original audio signal output of the scanner;
   (c) a transport network having at least two edge nodes, the transport network being in communication at one edge node with the processing unit to receive the digitally encoded audio and being in communication at the other edge node with the scanner workstation to provide the digitally encoded audio to the scanner workstation in real-time, or in near real-time, and without buffering of the digitally encoded audio; and
   (d) a user workstation including an audio output and a user interface which allows a human agent to hear the original audio signal output of the one or more scanners provided by the scanner workstation and enter traffic report information into the user interface based upon the events that affect traffic in the original audio signal output.

23. The apparatus of claim 22 wherein the transport network delivers the digitally encoded audio via a voice over IP process.

24. The apparatus of claim 23 wherein the voice over IP process is unidirectional.

25. The apparatus of claim 22 wherein the processing unit is physically connected to the audio signal output of the scanner.

26. The apparatus of claim 22 wherein the transport network is physically connected at the one edge node to the processing unit and is physically connected at the other edge node to the scanner workstation.

27. The apparatus of claim 22 wherein the transport network is a public or private network.

28. The apparatus of claim 22 wherein the transport network is a switched network.

29. The apparatus of claim 22 wherein the transport network is a wireless network.

30. The apparatus of claim 22 wherein there are a plurality of scanners and at least some of the scanners are in locations remote from one another.

* * * * *